United States Patent Office — 2,979,531 — Patented Apr. 11, 1961

2,979,531
p-LOWER ALKYL SUBSTITUTED CUMYL DISULFIDES

Ellis K. Fields, Chicago, Ill., assignor to Standard Oil Company, Chicago, Ill., a corporation of Indiana No Drawing. Filed Sept. 2, 1954, Ser. No. 453,947

4 Claims. (Cl. 260—608)

My invention relates to the production of aromatic disulfides. More particularly, it relates to the production of cumyl disulfides from cumene or substituted cumenes and sulfur.

I have discovered that an aromatic disulfide of the following structure is formed by the reaction of cumene and substituted cumenes with sulfur in the presence of a basic catalyst:

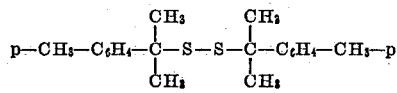

in which $R_1$ and $R_2$ are alkyl groups and $R_3$ is hydrogen or an alkyl group. In my co-pending applications S. N. 433,788, now abandoned, and 433,790, filed June 18, 1954, now Patent No. 2,816,116, I have described the production of aryl substituted trithiones by the base catalyzed reaction of cumene type hydrocarbons with sulfur. The new disulfides may be produced as co-products of the aryl substituted trithiones in substantial yields. In the preparation of the new disulfides, the mole ratio of starting aromatic hydrocarbon to sulfur may vary from about 1:6 to 4:1, but advantageously is about 3:2. The basic catalyst may be an inorganic base such as sodium or potassium hydroxide or an organic base such as an amine, amidine or guanidine. The preferred catalyst is di-ortho-tolylguanidine. The basic catalyst may be used in concentrations of about 0.001 percent by weight of the total reactants to about 1 percent by weight. A temperature in the range of about 150–220° C. may be used for a reaction period of approximately 4 to 200 hours. The reaction time appears to depend upon the temperature and the structure of the starting hydrocarbon. For example, p-cymene requires less than 8 hours for 80 percent completion of the reaction whereas p-t-butyl cumene may require as much as about 70 hours. On the other hand, normal propyl benzene and tertiary butyl benzene appear to remain substantially unreacted under comparable conditions so that a structure analogous to the structure of cumene or isopropyl benzene appears to be necessary for the starting hydrocarbon.

I have found that the new aromatic disulfides are effective in inhibiting oxidative corrosion when incorporated in small amounts in lubricating oils. The new disulfides also impart improved E.P. properties and load bearing properties to oils and consequently have value as additives for cutting oils and E.P. industrial oils. They may be added to cutting oil formulations as such or after sulfurization. The new disulfides are used as additives in concentrations of about 0.1 to 10 percent by weight but in oil blending operations ordinarily will be handled in the form of higher concentrates which are cut back or further blended to form the finished oil compositions. Also the new disulfides usually will be used in lubricating oil compositions containing other additives such as conventional detergents, corrosion inhibitors, anti-foam agents, pour depressants and the like. The following examples illustrate preparation and characterization of the new aromatic disulfides.

Example I

A mixture of 1108 grams (8.25 moles) p-cymene, 400 grams (12.5 moles) sulfur and 8.2 grams di-o-tolylguanidine was refluxed at 185° C. for 21 hours. The mixture was cooled at 5° C. for 2 hours, filtered from the resulting crystals of p-tolyltrithione, and distilled in vacuo up to a pot temperature of 100° C. at 2 mm. 575 grams p-cymene was recovered. The red viscous residue (330 grams) was di-p-cymene disulfide,

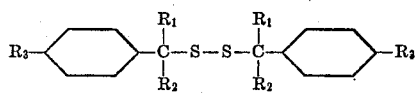

Analysis.—Calcd. for $C_{20}H_{26}S_2$: C, 72.73; H, 7.88; S, 19.39; mol. wt. 330. Found: C, 73.40; H, 6.95; S. 19.70; mol. wt. 322.

Example II

A mixture of 1500 grams (12.5 moles) cumene; 574 grams (18 moles) sulfur and 12 grams di-o-tolylguanidine was refluxed at 156° C. for 174 hours. The mixture was cooled to 10° C. for 2 hours, filtered from the resulting crystals of phenyl-trithione, and distilled in vacuo up to a pot temperature of 75° C. at 2 mm. 945 grams cumene was recovered. The residue, 418 grams, was cumene disulfide.

Example III

A mixture of 60 grams (0.405 mole) p-ethyl cumene, 19.4 grams (0.6 mole) sulfur and 0.4 gram di-o-tolylguanidine was heated at 200° C. for 4½ hours, cooled to 0° C. overnight, filtered from the trithione formed and distilled in vacuo up to a pot temperature of 100° C. at 2 mm. Thirty grams p-ethyl cumene were recovered. The residue, 17 grams, was di-p-ethylcumyl disulfide.

Analysis.—Calcd. for $C_{22}H_{30}S_2$: S, 17.87; mol. wt., 358. Found: S, 17.30; mol. wt., 335.

The structure of cumene disulfide (product of Example 2) was proved as follows: a solution of 30 grams cumene disulfide in 150 ml. tetrahydrofuran was added dropwise over 1 hour to 10 grams lithium aluminum hydride in 300 ml. tetrahydrofuran. The mixture was refluxed 3 hours, decomposed with ice water and 15% sulfuric acid, and extracted with 200 ml. isopropyl ether. The ether was washed with water, dried and distilled, giving 15 grams cumene mercaptan boiling at 63–64° C. at 2.3 mm., $n_D^{20}$ 1.5500.

Analysis.—Calcd. for $C_9H_{12}S$: C, 71.03; H, 7.90; S, 21.06; mol. wt. 152. Found: C, 71.35; H, 7.79; S, 20.9; mol. wt. 150. The infra-red spectrum of this new compound showed the —SH absorption peak at 3.9. All other absorption peaks were similar to those of cumene.

In similar manner, other cumyl disulfides may be prepared, e.g., p-butylcumyl, p-amylcumyl, or p-methoxycumyl disulfides and the like.

The effectiveness of the new disulfides as oxidation inhibitors may be illustrated by evaluation of the disulfides of Examples 1 and 3 under the conditions of a stirring sand corrosion test (SSCT). The disulfides were tested at 2 percent concentration in propane, dewaxed and solvent extracted SAE–30 oil as base oil. The oil also contained a detergent comprising an alkaline barium salt of a phosphorous pentasulfidebutylene polymer reaction product in a concentration of 5.44 percent by weight. The SSCT test is conducted as follows:

A copper-lead test specimen is lightly abraded with steel wool, washed with naphtha, dried and weighed to the nearest milligram. The cleaned copper-lead test specimen is suspended in a steel beaker, cleaned with a hot tri-sodium phosphate solution, rinsed with water, acetone and dried, and 250 grams of the oil to be tested, together with 0.625 gram lead oxide and 50 grams of a 30–35 mesh sand charged to the beaker. The beaker is then placed in a bath or heating block and heated to a temperature of 300° F. (±2° F.) while the contents are stirred by means of a stirrer rotating at 750 r.p.m. The contents of the beaker are maintained at this temperature for twenty-four hours, after which the copper-lead test specimen is removed, rinsed with naphtha, dried and weighed. The test specimen is then replaced in the beaker and an additional 0.375 gram of lead oxide added to the test oil. At the end of an additional twenty-four hours of test operation the test specimen is again removed, rinsed and dried as before, and weighed. The test specimen is again placed in the beaker together with an additional 0.250 gram of lead oxide and the test continued for another twenty-four hours (seventy-two hours total). At the conclusion of this time, the test specimen is removed from the beaker, rinsed in naphtha, dried and weighed. The loss in weight of the test specimen is recorded after each weighing. A weight loss of 200 mg. or less in 48 hours and 500 mg. or less in 72 hours is allowable.

The results of the test follow:

| Product | mg. corrosion | |
|---|---|---|
| | 48 hrs. | 72 hrs. |
| di-p-cymene disulfide | 172 | 249 |
| di-p-ethylcumyl disulfide | 180 | 228 |

The invention provides a simple direct method for the preparation of disulfides of the cumyl disulfide structure. There is no other simple, general method of preparation for such compounds.

I claim:
1. p-Lower-alkyl-substituted cumene disulfides.
2. Di-p-cymene disulfide.
3. p-Ethylcumyl disulfide.
4. p-Amylcumyl disulfide.

References Cited in the file of this patent

UNITED STATES PATENTS

| | | |
|---|---|---|
| 2,001,715 | Fischer | May 21, 1935 |
| 2,186,271 | Pevere | Jan. 9, 1940 |
| 2,205,858 | Mikeska et al. | June 25, 1940 |
| 2,273,471 | Kimball | Feb. 17, 1942 |

OTHER REFERENCES

Holmberg: Ark. Kemi Mineral Geol. 12A, No. 14, 10 pages (1937), cited in Chem. Abs. 31, 42925 (1937).